2,478,946

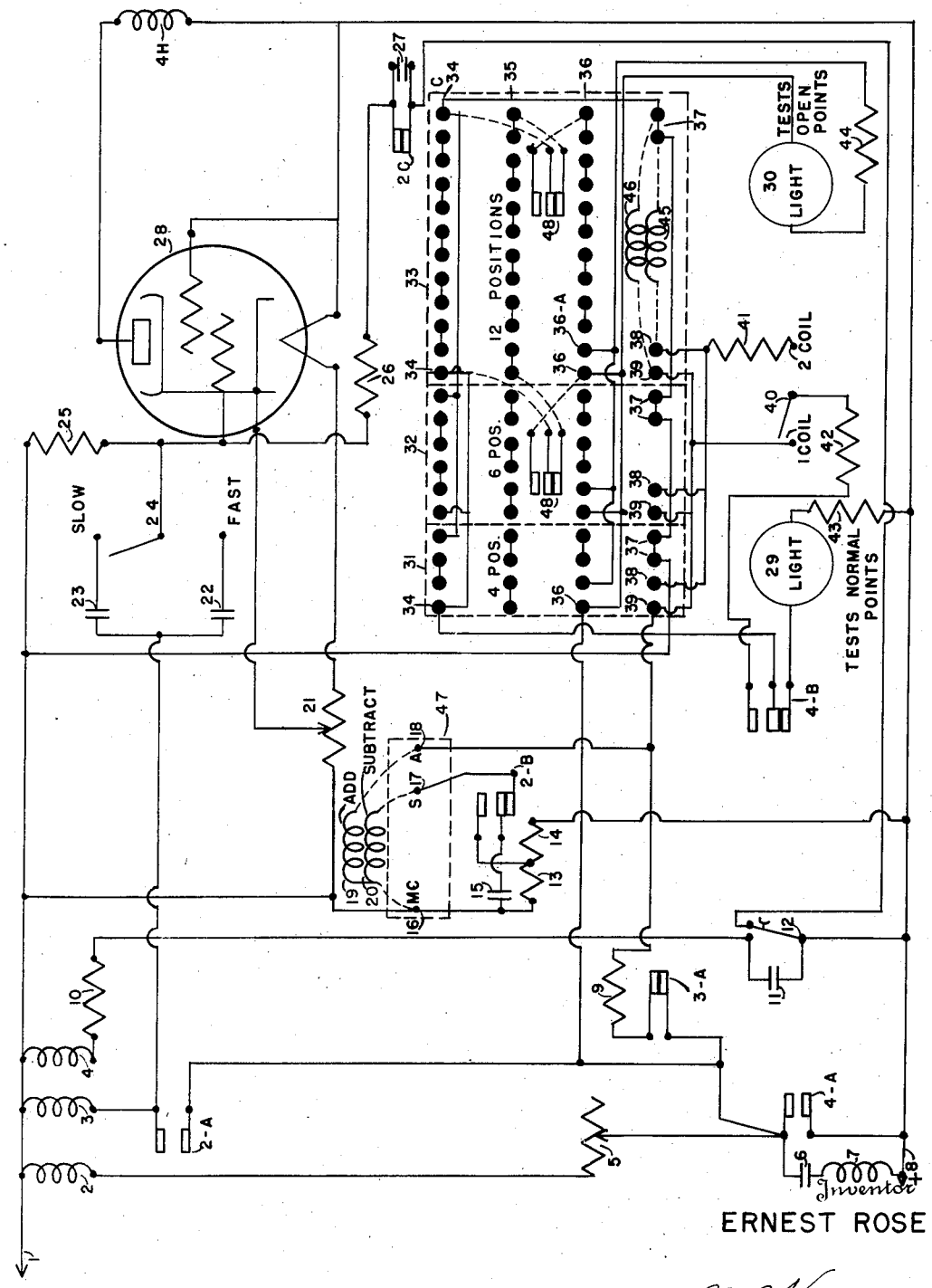
Aug. 16, 1949.    E. ROSE    2,478,946
RELAY TESTER
Filed Jan. 22, 1946
Inventor
ERNEST ROSE
By M. O. Hayes
Attorney Patented Aug. 16, 1949

UNITED STATES PATENT OFFICE 2,478,946

RELAY TESTER

Ernest Rose, United States Navy

Application January 22, 1946, Serial No. 642,774

4 Claims. (Cl. 175—183)

(Granted under the act of March 3, 1883, as amended April 30, 1928; 370 O. G. 757)

This invention relates to a relay tester, and particularly one for quickly and automatically testing large numbers of relays.

In the use of electrical accounting machinery, telephone systems, or other equipment involving the use of many relays; it is frequently necessary to test these relays for proper operation. To do this singly by setting up a different test circuit for each relay would involve a prohibitive amount of time, and a test circuit into which a relay may be quickly connected is very desirable for this work.

One object of this invention is to provide a tester into which a relay may be plugged and quickly tested.

Another object is to provide an automatic means for testing the pick-up time of a relay.

A further object is to provide an automatic means for testing the contact points and circuit continuity of a relay.

A still further object is to provide a device for testing the armature tripping time of magnetically controlled counters.

Other objects and advantages will be apparent from the following specification in conjunction with the appended claims.

The device of this invention consists of indicating lights, sockets to fit relays under test, and circuit means for sending impulses of timed duration through the relay coil. If the relay will pick-up in the prescribed time, a holding circuit will be established, and the continuity of circuits through its contacts will be indicated by signal lights both before and after pick-up.

A push button may be used for operating the device; or, as an alternative, a vacuum tube oscillator is provided for automatically initiating test impulses at a controlled rate. This rate may be of any value desired from a few seconds for each pulse to fifty per second, as found convenient for the particular circumstances.

The operation may be more easily understood by the following description in connection with the accompanying drawing, in which the single figure is a schematic diagram of the invention.

Referring now to the drawing, relays 2, 3, and 4 control the time of the test impulse to the relay, or counter, under test. Associated points for relays 2 to 4 are marked A, B, and C.

The relays under test may be of either the four position, six position, twelve position, or add and subtract type. A four position relay is one which generally has one or two operating coils wound thereon, either of which when energized is capable of operating four sets of contacts simultaneously. Each set of contacts comprises two fixed and one movable contact, the latter of which is moved when an operating coil is energized from a position normally in contact with one of the fixed contacts, called a front contact, into a position in contact with the other of the fixed contacts, called a back contact. For convenience in replacement, the coil terminals and the contact terminals are brought out to fixed plugs arranged at definite positions at the bottom of the relay so that a defective relay may easily be removed from the particular apparatus in which it is being used and replaced by a duplicate relay which may be readily plugged into position.

The six and twelve position relays are constructed in a similar manner to the four position relay except that they are provided respectively with six and twelve sets of contacts. The add and subtract type of relay generally is provided with two coils which may be individually energized to cause operation of a single set of contacts between two positions and is also provided with plugs at its terminals.

The tester of this invention is provided with plug boards 31, 32, 33 and 47 arranged with a sufficient number of plug sockets in the proper locations to receive the plugs of a four position, a six position, a twelve position, or an add and subtract relay, respectively, whereby such relays may be rapidly tested. For purposes of clarity, plug board 33 is illustrated as having a twelve position relay diagrammatically connected thereto, the coils of such relay being shown at 45 and 46 and only two of the twelve sets of contacts 48 being shown plugged in at opposite ends of the plug board 33 to plug sockets 34, 35 and 36. It will be understood that the remaining ten sets of contacts are plugged in a similar manner to the intervening sets of plug sockets 34, 35 and 36 on plug board 33 but are not shown to avoid undue complication of the drawing.

The manner of operation of the tester with a twelve position relay plugged therein will be described hereinafter and it will be understood that the test of a four position relay and a six position relay will follow the same operation so that it is unnecessary to describe the latter in detail.

The operation of the device under manual control is initiated by depressing push button 12, which will pick up relay 4 through a circuit including line 1, relay 4, resistor 10, push button 12, and line 8. At the time points 4A make, the impulse to the relay under test is through line 1, socket terminal 37, relay coil 46, socket terminal 39, resistor 9, normally closed points 3A, and made points 4A to line 8. At the same time a circuit will be established to pick up relay 2 through line 1, relay 2, rheostat 5, and relay points 4A to line 8. At the time points 2A make, a circuit to pick up relay 3 is established through line 1, relay 3, points 2A, and points 4A to line 8. Energizing relay 3 will open points 3A, breaking the test impulse to relay coil 46. The duration of the test impulse to coil 46 through points 3A is controlled by the pick up time of relays 2 and 3. This pick up time is variable by means of rheostat 5, and can be varied from a minimum of 2 milliseconds to approximately 20 milliseconds.

If relay coil 46 and associated armature and contact points 48 are properly adjusted to pick up in the time duration permitted by points 3A, a holding circuit for relay 46 will be formed through line 1, socket terminal 37, relay coil 46, socket terminal 39, switch 40, resistor 42, transferred points 4B, socket terminal 34, transferred contact points 48 in the first position at the left, socket terminal 36, and contact points 4A to line 8.

The relay under test will stay energized as long as points 4A are made. Release of push button 12 will drop relay 4 and return the circuits to normal.

The circuits of indicator light 29 constitute a check of continuity through all contact points 48 in the normal position. The circuit therefor is through line 1, extreme right hand socket terminal 37, extreme right hand socket terminal 34, right hand contact points 48 when closed in their front contact position as shown, extreme right hand socket terminal 35, which is electrically strapped to the next adjacent socket terminal 35 as shown, from the latter through the next adjacent set of front contact points 48 (not shown) to the socket terminal 34 next adjacent to the extreme right hand socket terminal 34, and in a series circuit through the front contacts of each of the remaining front contact points 48 (ten of which have not been illustrated) through their related socket terminals 35 and 34 in the manner described above, which series circuit eventually terminates at extreme left hand socket terminal 34 of plug board 33 as shown, whence the circuit continues through normally closed points 4B, light 29, and resistor 43 to line 8.

The series circuit through the twelve sets of front contacts 48 and their related socket terminals 34 and 35 is made possible by strapping pairs of socket terminals 34 together and staggering such strapped pairs of socket terminals with respect to similarly strapped pairs of socket terminals 35 as illustrated in the drawing whereby current can be passed through the contacts 48 in succession as part of a series circuit. It is apparent that if any one of the contacts 48 is not in its normally closed position and is open, the light 29 will fail to glow and this is an indication that at least one of the contacts 48 is defective in its normally closed position so that the relay may be discarded or repaired after detailed inspection.

It will be noted that the above described series circuit includes the contacts 4B in their normally closed position so that when relay coil 46 is energized as described hereinabove by energizing relay 4, the contacts 4B will move to their back contact position and will open the series circuit through front contacts 48 thereby eliminating arcing at front contacts 48 when they open. In the back contact position of contacts 4B, a holding circuit for relay coil 46 is closed from line 1 to extreme right hand socket terminal 37, through relay coil 46, socket terminal 39, switch 40 when closed to the left, resistor 42, contacts 4B closed in the back contact position, extreme left hand socket terminal 34 on plug board 33, contacts 48 closed in their back contact position, extreme left hand socket terminal 36 on plug board 33, and closed contacts 4A to line 8. This circuit maintains relay coil 46 energized until switch 12 is released even though contacts 3A which initially closed the circuit to relay coil 46 subsequently open.

The test circuit for testing the operativeness of each of the contacts 48 when closed in its back contact position by energization of relay coil 46 comprises a series circuit which, as indicated by the light 30, is through line 1, extreme right hand socket terminals 37 and 34, energized points 48, socket terminal 36, all other points 48 and associated terminals 36 and 34 in the manner described above, to the left terminal 36A of socket 33, resistor 44, light 30, terminal 36, and to points 4A and to line 8. It is obvious that if any of the contacts 48 is defective in its back contact position, this series circuit will be open at the defective contact and the light 30 will fail to glow thereby indicating necessity for repair or elimination of the defective relay being tested.

Switch 40 may be set in either of the one-coil or two-coil positions, depending on the type relay being tested.

Counter socket 47 is provided to test add and subtract magnets 19—20 of magnetically controlled counters, and for adjustment of the tripping time of their associated armature and mechanism. The circuit is so laid out that magnets 19 and 20 will receive alternate test impulses. Magnet 19 is tripped in the same manner as coil 46 by means of points 3A and 4A, the impulse duration being controlled as set forth above. At the time points 2B transfer, condenser 15 will charge to the potential of the voltage drop across resistor 13 through line 1, condenser 15, transferred points 2B, resistor 14, and line 8. At the time the test circuit returns to normal, dropping points 2B, condenser 15 will discharge through subtract magnet 20, tripping the associated armature mechanism. Therefore each time push button 12 is depressed magnet 19 will be energized; and when push button 12 is released condenser 15 will energize subtract magnet 20, providing a visual test of the action of the armature mechanism in the add and subtract positions. Inasmuch as the operation of the add and subtract magnets are visually indicated by the positions of the armatures, no lamp is necessary where only a pair of coils are to be individually tested.

Tube 28 is incorporated into the device to serve as an automatic substitute for the push button 12, and to generate pulses and make successive automatic tests of a relay. Coil 4H is in the anode circuit of the tube and is on the same core as coil 4. Thus coil 4H operates the relay 4 during automatic operation of the tester, but becomes inactive when push button 12 breaks the circuit to its upper contact, since this biases the tube to cut-off.

The combination of resistors 25 and 26 and condenser 22, or 23, with the tube; comprises a form of slow operating relaxation oscillator. Resistors 25 and 26 are high in value, and may be about five megohms; while condensers 22 and 23 may be of any desired value up to one microfarad or more, in order to produce the proper timing of pulses. One-half microfarad will produce about five pulses per minute. Resistors 25 and 26 are so proportioned that the energize and de-energize times of coil 4H are of equal duration, and resistors 25 and 26 with potentiometer 21 provide grid bias of a value which will cause relay 4 to be normally energized.

When the device is energized from power line 1, 8; the tube will operate relay 4; and this will initiate operation of relays 2 and 3, and test relay 45—46 as above described. When contact points 2C open, the grid of the tube will be in effect connected between resistor 25 and condenser 22 or 23, and the resistor and condenser connected across the power line. The condenser will begin to charge through the resistor, and gradually bring the grid of the tube to a cut-off bias. When this occurs, relay 4 will be released and the relay test circuits will return to normal.

When points 2A open and points 2C close, condenser 22, or 23, will be in effect connected across the resistor 25, since the resistances of coil 3 and of the power line are comparatively low, and the condenser will discharge; gradually returning tube 28 to a conducting state. The tube will then repeat the process, at a rate determined by the circuit constants.

The circuit constants and values given above are by way of example only, and are not intended as a limitation.

In the preferred embodiment, as described above, multiple sockets are shown at 31, 32, and 33 to take standard accounting machine relays, of four, six, and twelve positions. The device may be adapted to test telephone or other types of relays by providing the proper connecting means for the particular relays, and parallel connecting the leads to those shown. If the relay is not of the pluggable type; a set of small contact springs, arranged to touch the relay terminals, could be provided; and the relay manually held against these during the test. A set of flexible leads with clips may be provided for non-standard relays.

The invention described herein may be manufactured and used by or for the Government of the United States for governmental purposes without the payment of any royalty thereon or therefor.

What is claimed is:

1. A relay testing device adapted to test relays having a plurality of spaced apart front and back contacts and a plurality of movable contacts activated therebetween by a coil, comprising an adjustable oscillator for controlling the frequency of successive tests, a plurality of operating relays for applying potential to the coil of said test relay, the energization of the first of said operating relays being initiated by said oscillator and each of said operating relays in turn energizing the next relay in succession, variable resistance means in series with one of said operating relays for determining the duration of said applied potential, a socket board connected in parallel to said operating relays and energized thereby, said socket board having terminal means for detachably connecting into the circuit each of the contacts and the coil of the test relay, said terminal means having means connected therebetween for electrically connecting said contacts in series when the test relay is inserted in said socket board, the two endmost terminals of the serially connected terminal means acting as means for connecting a source of potential to said socket board, and indicating means interposed between said terminal means and said source of potential and adapted to be energized when there exists a series relationship between all of the contacts, the indicating means and the source of potential.

2. The relay testing device of claim 1 in which the indicating means comprises a first indicator adapted to be energized when there exists a completed series circuit between said first indicator, source of potential and all of the front and movable contacts of the test relay before its coil is energized, and a second indicator adapted to be energized when there exists a completed series circuit between said second indicator, source of potential, and back and movable contacts of the test relay after its coil is energized.

3. The relay testing device of claim 1 in which there is a holding circuit for said test relay coil once it has been energized comprising a circuit completing means, one set of contacts of said test relay, and said test relay coil, all connected in series relationship, said circuit completing means being normally open contacts of one of said operating relays, said contacts closing and establishing the holding circuit when the operating relay is energized.

4. A relay testing device adapted to test relays having a plurality of normally closed and normally open contacts and a coil for activating a movable contact therebetween, comprising an adjustable oscillator, a series of operating relays the first of which is initiated by said oscillator, the contacts of each of said operating relays completing a circuit to energize the next operating relay in the series, the functioning of said operating relays acting to apply potential to said coil of the test relay, terminal means connected in parallel to said operating relays and energized thereby, said terminal means furnishing detachable connections for each of the contacts and coil of said test relay, said terminal means having means connected therebetween for electrically connecting all of said normally closed contacts in series and all of said normally open contacts in series when said test relay is connected to said terminal means, a first indicating means interposed between said terminal means and a source of potential, said first indicating means being adapted to be energized when there is a complete series circuit between said first indicator, source of potential and all of said normally closed contacts before said aforementioned coil is energized, and a second indicating means interposed between said terminal means and said source of potential, said second indicating means being adapted to be energized when there is a complete series circuit between said second indicator, source of potential and all of said normally open contacts after said aforementioned coil is energized.

ERNEST ROSE.

REFERENCES CITED

The following references are of record in the file of this patent:

UNITED STATES PATENTS

| Number | Name | Date |
| --- | --- | --- |
| 1,487,267 | Retallack | Mar. 18, 1924 |
| 1,561,951 | Stacy | Nov. 17, 1925 |
| 2,279,007 | Mortley | Apr. 7, 1942 |
| 2,305,378 | Cypser | Dec. 15, 1942 |
| 2,369,619 | Stibitz | Feb. 13, 1945 |
| 2,415,942 | Farr et al. | Feb. 18, 1947 |